United States Patent
Moya

(10) Patent No.: US 7,288,600 B2
(45) Date of Patent: *Oct. 30, 2007

(54) FLUOROCARBON POLYMERIC COMPOSITIONS HAVING HYDROPHILIC FUNCTIONAL GROUPS AND PROCESS

(75) Inventor: Wilson Moya, Concord, MA (US)

(73) Assignee: Entegris, Inc., Chaska, MN (US)

( * ) Notice: Subject to any disclaimer, the term of this patent is extended or adjusted under 35 U.S.C. 154(b) by 189 days.

This patent is subject to a terminal disclaimer.

(21) Appl. No.: 10/848,399

(22) Filed: May 18, 2004

(65) Prior Publication Data

US 2004/0214957 A1    Oct. 28, 2004

Related U.S. Application Data

(62) Division of application No. 10/089,217, filed as application No. PCT/US00/28019 on Oct. 10, 2000, now abandoned.

(60) Provisional application No. 60/158,941, filed on Oct. 12, 1999.

(51) Int. Cl.
C08F 8/32       (2006.01)

(52) U.S. Cl. ................. 525/326.2; 525/326.3; 525/326.4; 525/374

(58) Field of Classification Search ............. 525/326.2, 525/326.3, 326.4
See application file for complete search history.

(56) References Cited

U.S. PATENT DOCUMENTS

| | | | |
|---|---|---|---|
| 4,126,589 A | 11/1978 | Hamada et al. | |
| 4,810,760 A | 3/1989 | Strepparola et al. | |
| 4,851,121 A | 7/1989 | Yokota et al. | |
| 5,463,005 A | 10/1995 | Desmarteau | |
| 5,874,616 A | 2/1999 | Howells et al. | |
| 6,670,424 B1 | 12/2003 | Michot | |
| 7,112,363 B2 | 9/2006 | Moya | |

FOREIGN PATENT DOCUMENTS

| | | |
|---|---|---|
| EP | 0 166 105 | 1/1986 |
| EP | 0 178 935 | 4/1986 |
| EP | 0 229 451 | 7/1987 |
| EP | 0 457 255 A2 | 11/1991 |
| FR | 1.221.362 | 6/1960 |
| FR | 2.024.289 | 8/1970 |
| FR | 2.096.180 | 2/1972 |
| FR | 2.170.077 | 9/1973 |
| WO | WO 99/38842 | 8/1999 |
| WO | WO 99/38897 | 8/1999 |
| WO | WO01/58577 | 8/2001 |

OTHER PUBLICATIONS

International Search Report for PCT/US01/26720 (Jun. 2002).

*Primary Examiner*—Bernard Lipman
(74) *Attorney, Agent, or Firm*—John Pillion; Timothy King; Michael Patane

(57) ABSTRACT

A crosslinked fluorocarbon such as perfluorocarbon, polymeric composition is provided having hydrophilic functional groups, which is crosslinked with fluorinated such as perfluorinated crosslinking groups. Also provided is a branched fluorocarbon such as perfluorocarbon, polymeric composition having hydrophilic functional groups.

4 Claims, No Drawings

US 7,288,600 B2

FLUOROCARBON POLYMERIC COMPOSITIONS HAVING HYDROPHILIC FUNCTIONAL GROUPS AND PROCESS

This application is a divisional of U.S. Ser. No. 10/089,217, filed Mar. 25, 2002 now abandoned which is a national phase filing of PCT/US00/28019 filed 10 Oct. 2000, which claims priority to provisional application 60/158,941, filed 12 Oct. 1999.

BACKGROUND OF THE INVENTION

1. Field of the Invention

This invention relates to fluorocarbon polymeric compositions having hydrophilic functional groups and more particularly a branched fluorocarbon polymeric composition having hydrophilic functional groups or a crosslinked fluorocarbon polymeric composition having hydrophilic functional groups and to a process for forming the branched fluorocarbon polymeric composition or crosslinked fluorocarbon polymeric composition having hydrophilic functional groups.

2. Description of the Prior Art

Articles made of fluorocarbon polymeric compositions are useful in a wide variety of environments due to their chemical inertness. Fluorocarbon polymeric compositions such as polytetrafluoroethylene (PTFE), fluorinated ethylene-propylene copolymer (FEP), perfluoroalkoxy polymer (PFA) or polyvinylidene fluoride (PVDF) are commonly utilized in applications where highly reactive reagents are encountered and are formed into a variety of shapes including films, membranes, beads, tubes, fibers, fabrics, hollow fibers or the like.

One disadvantage of fluorocarbon polymeric compositions is their relatively low surface energy resulting in hydrophobic properties due to a lack of hydrophilic functional groups on the polymer chain. Therefore articles made from such polymers exhibit repellency properties towards water, aqueous fluids or other fluids that have surface tensions greater than the surface energy of the article. This characteristic can lead to poor contact between the surface of the article and a fluid having a relatively high surface tension in applications where intimate contact of the article's surface and the fluid is desired. This poor contact or lack of intimate contact between the surface and the fluid can lead to undesirably poor wetting or dewetting of the article's surface during use in these applications.

It is desirable to render the surface of a hydrophobic fluorocarbon polymeric composition such as a chemically inert fluorocarbon polymeric composition more hydrophilic. For example, mesh or woven or non-woven fabrics made from fibers of a fluorocarbon polymeric composition in some environments are desired to be more hydrophilic such as when used to form absorbent fabrics. In addition, it is desirable to render other fluorocarbon polymeric compositions ionic and more hydrophilic such as in non-porous ion exchange film membranes used in electrolysis, dialysis, fuel cells or chlor-alkali cells so that more intimate contact is attained between the aqueous fluid being processed and the film or membrane surface. Film membranes of this type made from more hydrophilic fluorocarbon polymeric compositions also exhibit enhanced ion transport across the bulk of the film resulting in more efficient processes.

It has been proposed in U.S. Pat. No. 5,928,792 to Moya, U.S. Pat. No. 4,470,859 to Benezra et al and U.S. Pat. No. 4,902,308 to Mallouk et al to modify a substrate surface with a perfluorocarbon copolymer composition containing sulfonic acid groups to render the surface more hydrophilic. While the surface is rendered more hydrophilic, the thermal stability of the perfluorocarbon copolymer composition containing sulfonic acid groups is reduced. The perfluorocarbon copolymer composition containing sulfonic acid groups begins to significantly degrade at about 150° C.

U.S. Pat. No. 5,874,616 to Howells et al discloses a process for making linear polymeric bis (fluoroalkylene-sulfonyl)imides by reacting a difunctional fluoroalkylene sulfonamide compound with a difunctional fluoroalkylene sulfonyl halide compound. Since this process relies on the use of low molecular weight reactants to produce the polymer, it is difficult to control the molecular weight distribution of the final linear polymeric composition and therefore it is undesirable. In addition, the linear polymeric bis(fluoroalkylenesulfonyl)imides cannot be crosslinked.

U.S. Pat. No. 5,463,005 to Desmarteau discloses a process for forming a copolymer of tetrafluoroethylene (TFE) and a sulfonimide-containing unsaturated monomer wherein the monomer is derived from a sulfonimide-containing reagent. Since TFE is a toxic reagent, its use is undesirable. In addition, since this process relies on the use of low molecular weight unsaturated monomers, it is difficult to control the molecular weight distribution of the final polymeric composition.

It has been proposed by Shimazo in J. Electroanal. Chem. 258 (1998) pp. 49-59 to crosslink a perfluorocarbon copolymer composition such as Nafion™ films with radio frequency plasma. Crosslinking with a plasma is effected without the introduction of crosslinking groups. Crosslinking is effected through a bond linking two polymer chains. Unfortunately, ionizing radiation such as plasma degrades the perfluorocarbon copolymer composition.

It has been proposed by Greso et al in POLYMER vol. 38 No. 6 (1997), pp. 1345-1356 to crosslink a perfluorocarbon copolymer composition such as Nafion™ films via Si—O—Si bridges. This process is undesirable since the product contains a bound inorganic phase, which is chemically unstable.

It has been proposed by Covitch et al in Polymer Science and Technology Vol. 16, pp. 257-267 (1982) to crosslink a perfluorocarbon copolymer composition such as Nafion™ films with ethylenediamine and heat. This process is undesirable since the product contains a non-fluorinated ethylene portion, which is chemically unstable.

International Patent application PCT/CA99138897 discloses a fluorinated cross-linked polymeric compositions containing sulfonyl groups.

It would be desirable to provide a fluorocarbon polymeric composition having hydrophilic functional groups, which has improved hydrophilic properties and which is chemically stable. In addition, it would be desirable to provide such a polymeric composition which is produced from a fluorocarbon polymer precursor and which can be crosslinked.

SUMMARY OF THE INVENTION

This invention provides a branched fluorocarbon, preferably perfluorinated, polymer composition having hydrbphilic functional groups formed from a fluorocarbon, preferably perfluorinated, polymer precursor. This invention further provides for the first time a crosslinked fluorocarbon, preferably perfluorinated, polymeric composition having hydrophilic functional groups, which is crosslinked with fluorinated crosslinking groups, formed from a fluorocarbon polymer precursor, which is thermally and chemically stable and which can be rendered more hydrophilic than its fluorocarbon polymer precursor. This invention also provides ionic, branched fluorocarbon polymeric compositions and ionic crosslinked fluorocarbon polymeric compositions. This invention is based upon the discovery that a fluorocarbon polymer precursor can be chemically modified to produce a branched or a crosslinked fluorocarbon polymeric composition, which has enhanced hydrophilic properties and which is chemically stable.

In one embodiment, this invention provides a crosslinked perfluorocarbon polymeric composition, which is crosslinked with perfluorinated crosslinking groups. These crosslinked perfluorocarbon polymeric compositions are chemically stable in that they are perfluorinated and are crosslinked with perfluorinated linking moieties, which are stable against degradation by virtue of contact with highly reactive reagents such as liquid compositions containing a base such as ammonium hydroxide, an oxidizer such as hydrogen peroxide or ozone and water, having a pH greater than about 9 such as special cleaning (SC) solutions, for example SC1 used during the manufacture of electronic components. In contrast, crosslinking moieties containing non-perfluorinated organic groups become degraded upon contact with these reagents and these chemical crosslinks are destroyed so that the crosslinked polymer loses its original degree of crosslinking.

In one aspect of this invention a novel branched fluorocarbon polymeric composition having hydrophilic functional groups is provided wherein at least one hydrophilic functional group is a sulfonyl or carbonyl-containing group of the formula:

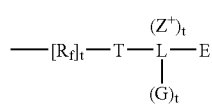

(1)

and which is a branch or side group covalently bonded through the $R_f$ group to a CY group of a fluorocarbon polymeric composition of the formula:

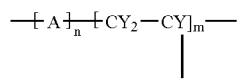

(2)

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; $R_f$ is a $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $Z^+$ is a proton or an organic or an inorganic cation and t can be 0 or 1; L is C, CH, or N; E is $R_f'T-$ or $R_f'-$; G is $R_f'T-$ or R, wherein R is hydrogen or a substituted or unsubstituted alkyl or aryl group and $R_f'$ is $C_1$-$C_{20}$ linear, cyclic or branched fluoroalkyl, preferably perfluoroalkyl, radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group.

In one aspect of this invention a novel branched fluorocarbon polymeric composition having hydrophilic functional groups is provided wherein at least one hydrophilic functional group is provided of the formulae:

(1a)

wherein L' is $C^-$ or CH, L" is H or $-TR_f''$; $R_f''$ is $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group; T, $Z^+$, t, $R_f$ and are defined above, or

(1b)

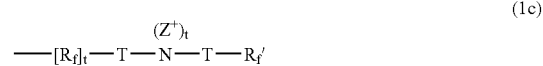

(1c)

and which is a branch or side group covalently bonded through the $R_f$ group to a CY group of a fluorocarbon polymeric composition of the formula:

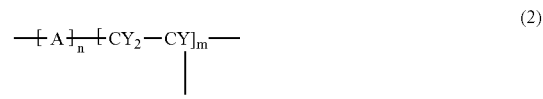

(2)

wherein A, Y, $R_f$, T, R, $R_f'$, Z, n, m and t are defined above.

In one aspect of this invention, the branched fluorocarbon polymeric composition having hydrophilic functional groups of formula (1c) such as a sulfonimide composition of the formula:

(1d)

is prepared by reacting a fluorocarbon polymer precursor containing at least one pendant sulfonyl or carbonyl halide group having the formula:

(3)

wherein X is a halogen such as fluorine, chlorine, bromine or iodine and T and $R_f$ are defined above, with a substituted or unsubsbtuted amide or sulfonamide-containing reactant of the formula:

(4)

wherein R' is hydrogen or substituted or unsubstituted alkyl or aryl groups and T, R and $R_f'$ are defined above. Altem atively, an organic or inorganic salt of the amide or sulfonamide-containing reactant can be used, having the formula:

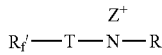 (5)

wherein T, R, $R_f'$ and $Z^+$ are defined above, or mixtures of reactants (4) and (5).

In another aspect of this invention, the branched fluorocarbon polymeric composition having hydrophilic functional groups of this invention is prepared by reacting a fluorocarbon polymer precursor containing at least one pendant substituted or unsubstituted amide or sulfonamide group having the formula:

$$-[R_f]_t\text{-T-NRR'} \quad (6)$$

wherein R, t, T, R' and $R_f'$ are defined above; alternatively, an organic or inorganic salt of the amide or sulfonamide group can be used, having the formula:

 (7)

wherein R, t, T, $R_f$ and $Z^+$ are defined above, or mixtures thereof, with a sulfonyl or carbonyl halide-containing reactant of the formula:

$$R_f'\text{-T-X} \quad (8)$$

wherein T, $R_f'$ and X are defined above. The fluorocarbon polyiner precursor containing pendant amide or sulfonamide groups can be prepared by reacting the sulfonyl or carbonyl halide groups of a fluorocarbon polymer precursor having sulfonyl or carbonyl halide groups with anhydrous ammonia.

In another aspect of this invention, a crosslinked fluorocarbon, such as perfluorocarbon, polymeric composition having hydrophilic functional groups of this invention is provided having connecting bridges or crosslinks having sulfonyl or carbonyl-containing groups joining polymeric chains, which can include loops joining portions of a polymeric chain, such as compositions having the formula:

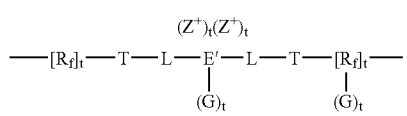 (9)

covalently bonded through the $R_f$ groups each to a CY group of a fluorocarbon polymeric composition of the formula:

 (2)

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; $R_f$ is a $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $Z^+$ is a proton or an organic or an inorganic cation; t can be 0 or 1; L is C, CH or N; E' is $-TR_f''T-$ or $-R_f'-$; G is $R_f'T-$ or R; $R_f'$ is $C_1$-$C_{20}$ linear, cyclic or branched fluoroalkyl, preferably perfluoroalkyl, radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group; $R_f''$ is $C_1$-C20 linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon polymeric composition having hydrophilic functional groups and R is hydrogen or a substituted or unsubstituted alkyl or aryl group.

In another aspect of this invention, the crosslinked fluorocarbon, such as perfluorocarbon, polymeric composition having hydrophilic functional groups of this invention is provided having connecting bridges or crosslinks joining polymeric chains, which can include loops joining portions of a polymeric chain, such as compositions having the formulae:

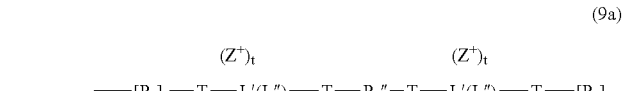 (9a)

wherein L' is $C^-$ or CH, L" is H or $-TR_f''$ and T, $Z^+$, t, $R_f$ and $R_f''$ are defined above, or $$-[R_f]_t\text{-T-N(R)}R_f''\text{N(R)-T-}[R_f]_t- \quad (9b)$$

or

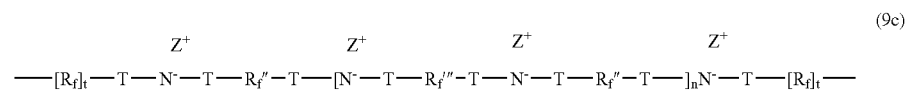 (9c)

covalently bonded through the $R_f$ groups, each to a CY group of a fluorocarbon polymeric composition of the formula:

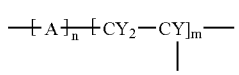 (2)

wherein A, Y, n, m, $R_f''$ and $R_f'''$ can be the same or different and can be a $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon polymeric composition having hydrophilic functional groups; T, t, $R_f$ and R are defined above.

In another aspect of this invention, the crosslinked fluorocarbon polymeric composition having hydrophilic functional groups of formula (9c) such as a sulfonimide composition of the formula:

 (9d)

is prepared by reacting a fluorocarbon polymer precursor containing at least one pendant sulfonyl or carbonyl halide group having the formula:

$-[R_f]_t$-T-X (3)

wherein $R_f$, T and X are defined above, with a reactant containing at least two substituted or unsubstituted amide or sulfonamide groups such as reactants having the formula:

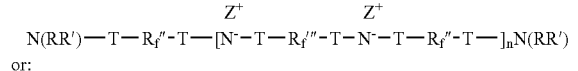 (10)

or:

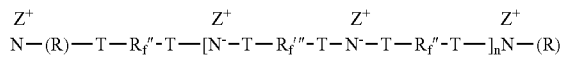 (11)

or mixtures thereof, wherein T, R, R' $R_f'$, $R_f''$, $R_f'''$, n and $Z^+$ are defined above.

Alternatively a fluorocarbon polymer precursor containing at least one pendant sulfonyl or carbonyl halide group of reactant (3) can be reacted with a fluorocarbon polymer precursor containing at least one pendant amide or sulfonamide group of reactant (6) or (7) defined above.

In another aspect of this invention, the crosslinked fluorocarbon polymeric composition having hydrophilic functional groups of this invention is prepared by reacting a fluorocarbon polymer precursor containing at least one pendant substituted or unsubstituted amide or sulfonamide group having the formula:

$-[R_f]_t$-T-NRR' (6)

wherein R, t, R' and $R_f'$ are defined above or an organic or inorganic salt of the amide or sulfonamide group having the formula:

 (7)

wherein $R_f$, T, R, $Z^+$ and t are defined above, with a reactant containing at least two sulfonyl or carbonyl halide groups such as compositions having the formula:

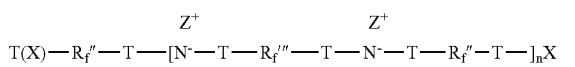 (12)

wherein T, $R_f''$, $R_f'''$, n, X and $Z^+$ are defined above. The fluorocarbon polymer precursor containing pendant amide or sulfonamide groups can be prepared by reacting the sulfonyl or carbonyl halide groups of a fluorocarbon polymer precursor having sulfonyl or carbonyl halide groups with anhydrous ammonia.

The branched fluorocarbon polymeric composition having hydrophilic functional groups of this invention is prepared by the modification of an existing fluorocarbon polymer precursor while avoiding the use of polymerizable unsaturated monomers that are difficult to control during polymerization. In addition, the crosslinked fluorocarbon polymeric compositions having hydrophilic functional groups of this invention are less swellable in solvents such as alcohols than are uncrosslinked polymers which renders them useful as fuel cell membranes having ionic properties with substantially reduced unsdesirable mass transfer through the membrane while retaining desirable ionic transfer through the membrane.

DESCRIPTION OF THE SPECIFIC EMBODIMENTS

Exemplary fluorocarbon, preferably perfluorinated, polymer precursor from which the branched or crosslinked fluorocarbon polymeric compositions having hydrophilic functional groups are prepared comprise polymer compositions known generally as. perfluorocarbon polymeric compositions such as those marketed by E. I. Dupont de Nemours and Company, Inc. under the name NAFION® or by Asahi Glass Company, Limited under the name FLEMION®.

The fluorocarbon polymer precursors useful in the present invention are defined by the formula:

 (13)

wherein A is a polymeric group derived from at least one fluorine-containing polymerizable monomer such as vinyl fluoride, hexafluoropropylene, vinylidene fluoride, trifluoroethylene, trifluorostyrene, chlorotrifluoroethylene, perfluoro(alkylvinyl ether), tetrafluoroethylene, cyclic monomers such as CF=CF(OCF$_3$)OCF$_2$O or CF=CFOC(CF$_3$)$_2$O and mixtures thereof. Y is hydrogen or halogen wherein at least one Y is a fluorine and wherein it is preferred that all Ys are fluorine. B is a sulfonyl or carbonyl halide functional group or a group, which can be converted to a sulfonyl or carbonyl halide group such as sulfonic acid groups or salts thereof, amide or sulfonamide groups, carboxylic acid groups or salts thereof or the like; n and p are 0, 1 or an integer greater than 1; m is an integer of at least 1. R$_f$ is defined above.

Useful fluorocarbon polymer precursors can be polymers containing one or more monomers containing sulfonyl fluoride groups, which are set forth in U.S. Pat. Nos. 3,282,875; 3,041,317; 3,560,568; 3,718,627, which are incorporated herein by reference. Methods of preparation of perfluorocarbon polymeric compositions are set forth in U.S. Pat. Nos. 3,041,317; 2,393,967; 2,559,752 and 2,593,583, which are incorporated herein by reference. These perfluorocarbon polymeric compositions generally have pendant SO$_2$F based functional groups.

Examples of perfluorocarbon polymeric compositions containing sulfonyl-based functional groups are disclosed in U.S. Pat. No. 3,282,875, U.S. Pat. No. 3,560,568 and U.S. Pat. No. 3,718,627, which are incorporated herein by reference.

Illustrative of suitable sulfonyl fluoride containing monomers are

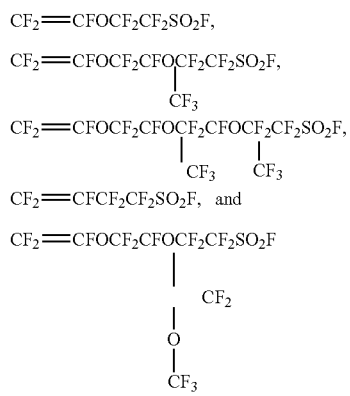

Other suitable fluorocarbon polymer precursors are polymers containing one or more monomers lacking sulfonyl or carbonyl halide functional groups, but which can be modified to include sulfonyl or carbonyl halide groups before or after forming the polymer. Suitable monomers of this type include trifluorostyrene, trifluorostyrenesulfonic acid or the like.

Fluorocarbon polymer precursors having pendant carbonyl-based functional groups can be prepared in any suitable conventional manner such as in accordance with U.S. Pat. No. 4,151,052 or Japanese patent application No. 52(1977) 38486 which are incorporated herein by reference or polymerized from a carbonyl functional group containing a monomer derived from a sulfonyl group containing monomer by a method such as is shown in U.S. Pat. No. 4,151,051 which is incorporated herein by reference. Illustrative examples of carbonyl-containing monomers include:

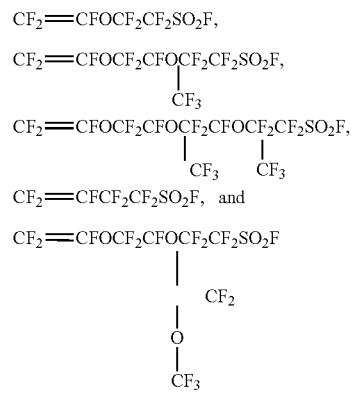

Preferred carbonyl containing monomers include:

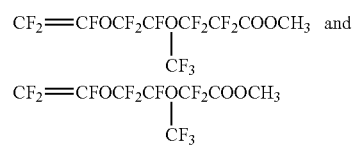

Particularly suitable fluorocarbon polymer precursors are copolymers of tetrafluoroethylene and a monomer having the formula:

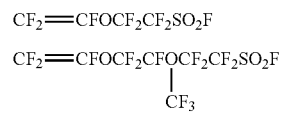

or

A sulfonic acid form of the fluorocarbon polymer precursor can be converted to the sulfonyl or carbonyl halide form of the fluorocarbon polymer precursor by a one step or two step process. In the one step process, the sulfonic acid form of the fluorocarbon polymer precursor can be reacted with PCl$_5$ and POCl$_3$ to produce the sulfonyl chloride form of the fluorocarbon polymer precursor such as described in U.S. Pat. No. 4,209,367 which is incorporated herein by reference. When the sulfonyl fluoride form is desired, the sulfonyl chloride form is reacted with KF to produce the sulfonyl fluoride form of the fluorocarbon polymer precursor in a second step. Both the sulfonyl chloride and the sulfonyl fluoride can be used in the process of this invention as described above.

The fluorocarbon polymer precursor used in the process of this invention to form the branched or the crosslinked fluorocarbon polymeric compositions having hydrophilic functional groups need not be restricted to a particular equivalent weight, instead, any polymer precursor having any equivalent weight may be used. Generally the equivalent weight of the fluorocarbon polymer precursor is between about 150 and about 2000, more usually between about 280 and about 1500. The equivalent weight of the fluorocarbon polymer precursor is the average molecular weight of the polymer of formula (13) divided by the total number of functional groups B present in the polymer.

In one aspect of this invention a novel branched fluorocarbon polymeric composition having hydrophilic functional groups is provided wherein at least one hydrophilic functional group is a sulfonyl or carbonyl-containing group of the formula:

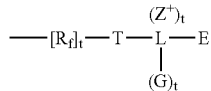
(1)

and which is a branch or side group covalently bonded through the $R_f$ group to a CY group of a fluorocarbon polymeric composition of the formula:

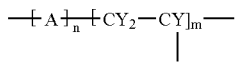
(2)

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; $R_f$ is a $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $Z^+$ is a proton or an organic or an inorganic cation; t can be 0 or 1; L is C, CH or N; E is $R_f'T$- or $R_f'$—; G is $R_f'T$— or R; $R_f'$ is C1-C20 linear, cyclic or branched fluoroalkyl, preferably perfluoroalkyl, radical optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group and R is hydrogen or a substituted or unsubstituted alkyl or aryl group.

Representative branched fluorocarbon polymeric compositions having hydrophilic functional groups of formula (1) include:

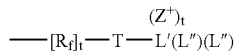
(1a)

wherein L' is $C^-$ or CH, L" is H or -$TR_f$" and T, $Z^+$, t, and $R_f$ are defined above and $R_f$" is a $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group.

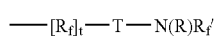
(1b)

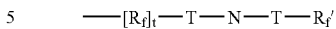
(1c)

wherein T, $R_f$, $R_f'$, R, $Z^+$ and t are defined above.

The compound of formula (1a) is formed by reacting a compound containing the functional group $(R_f'SO_2)_2C^{-2}(Z^+_2)$ or $(R_f'CO)_2C^{-2}(Z^{+2})$ with a fluorocarbon polymer precursor containing at least one pendant sulfonyl or carbonyl halide group or by reacting a compound of the formula —[$R_f$]$_t$$SO_2C^{-2}(Z^{+2})SO_2R_f'$ or —[$R_f$]$_t$$C(O)C^{-2}(Z^{+2})COR_f'$ with a compound of the formula $R_f'SO_2X$ or $R_f'COX$. The compounds of formulae $(R_f'SO_2)_2C^{-2}(Z^{+2})$, $(R_f'CO)_2C^{-2}(Z^{+2})$ and —[$R_f$]$_t$$SO_2C^{-2}(Z^{+2})SO_2R_f'$ or —[$R_f$]$_t$$C(O)C^{-2}(Z^{+2})COR_f'$ can be prepared by reacting the corresponding bis-sulfonyl methanes or carbonyl methanes with an alkylmagnesium halide by the method described in U.S. Pat. No. 2,732,398, which is incorporated herein by reference. Suitable compounds of the formula $(R_f'SO_2)_2C^{-2}(Z^{+2})$ include $(CF_3SO_2)[CF_3(CF_2)_3SO_2]C^{-2}$ $2MgCl^-$, $(CF_3SO_2)_2C^{-2}$ $2MgCl^-$, or the like. Suitable compounds of the formula $(R_f'CO)_2C^{-2}(Z^{+2})$ include $(CF_3CO)[CF_3(CF_2)_3CO]C^{-2}$ $2MgCl^-$, $(CF_3CO)_2C^{-2}$ $2MgCl^-$, or the like.

The compound of formula (1b) is formed by reacting a fluorocarbon polymer precursor containing at least one pendant sulfonyl or carbonyl halide group with a compound of the formula $R_f'NHR$ such as $CF_3(CF_2)_3NH_2$, $CF_3NH_2$, or the like.

In one aspect of this invention a novel branched fluorocarbon polymeric composition having hydrophilic functional groups is provided wherein at least one hydrophilic functional sulfonimide group of formula (1d):

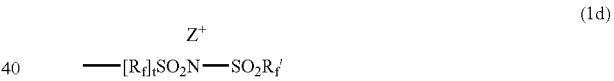
(1d)

is a branch or side group covalently bonded through the $R_f$ group to a CY group of a fluorocarbon polymeric composition of the formula:

(2)

wherein A, Y, n, m, $R_f$, $R_f'$, t, and $Z^+$ are defined above.

Representative suitable $R_f$ groups include —[$OCF_2CF_2$]—, [$OCF_2CF(CF_3)OCF_2CF_2$]—, —[($CF_2$)$_4$$SO_2N^-(Na^+)SO_2(CF_2)_4$]— or the like. Representative suitable $R_f'$ groups include —$CF_3$, —$C_2F_5$, —$C_2F_4H$, —$C_4F_9$, —$C_8F_{17}$, —[$OCF_2CF(CF_3)O(CF_2)_2SO_2N^-(H^+)SO_2CF_3$], —$CF_2COF$, —$CF_2COOH$ or the like. Representative imide or sulfonimide-containing fluoropolymeric groups or organic or inorganic salts of the imide or sulfonimide groups can be formed from the compounds of formulae (10), (11) and (12). Representative suitable $Z^+$ groups include a proton, an alkali metal ion such as sodium, potassium, or the like, or an organic cation such as ammonium or triethylammonium groups, or the like.

In one aspect of this invention, the branched fluorocarbon polymeric composition having hydrophilic functional groups of this invention is prepared by reacting a fluorocarbon polymer precursor containing at least one pendant sulfonyl or carbonyl halide group having the formula:

 (3)

wherein X is a halogen such as fluorine, chlorine, bromine or iodine and T, t and $R_f$ are defined above, with a substituted or unsubstituted amide or sulfonamide-containing reactant or mixtures thereof of the formula:

$R_f'$-T-NRR' (4)

wherein R and R' are hydrogen or substituted or unsubstituted alkyl or aryl groups and T and $R_f'$ are defined above. Alternatively, an organic or inorganic salt of the amide or sulfonamide-containing reactant can be used, having the formula:

 (5)

wherein R, $R_f'$, T and $Z^+$ are defined above or mixtures of reactants (4) and (5).

The reaction of the fluorocarbon polymer precursor with the substituted or unsubstituted amide or sulfonamide-containing reactant or salt thereof is believed to proceed via a condensation mechanism between the sulfonyl or carbonyl halide groups of the fluorocarbon polymer precursor and the amide or sulfonamide groups of the amide or sulfonamide-containing reactant thereby liberating a halide-containing byproduct. A non-nucleophilic base is typically used to scavenge and bind the halide-containing byproduct so that the reaction can proceed to the formation of the branched fluorocarbon polymeric composition having hydrophilic functional groups. The reaction is believed to proceed according to the following scheme 1, with reference to the substituted or unsubstituted amide or sulfonamide-containing reactant of formula (4):

Scheme 1

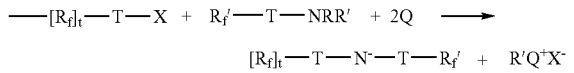

wherein Q is a non-nucleophilic base, $RQ^+$ and $R'Q^+$ are cations derived from the non-nucleophilic base and T, $R_f$, $R_f'$, X, R, R' and t are defined above.

Reaction of the fluorocarbon polymer precursor having sulfonyl or carbonyl halide groups with the substituted or unsubstituted amide or sulfonamide-containing reactant or salt thereof can be carried out with the fluorocarbon polymer precursor being in solid form, solvent-swollen form or in solution with the appropriate reactants in the solid, liquid or gas phase. When the fluorocarbon polymer precursor is in the solid form, the reaction is carried out under anhydrous conditions by contacting it with the substituted or unsubstituted amide or sulfonamide-containing reactant or salt thereof in a solvent that is non-reactive with the starting reactants. Representative suitable solvents include anhydrous polar aprotic solvents such as acetonitrile, tetrahydrofuran, dioxane, or the like, halogenated solvents such as chloroform, or the like. The reaction is carried out in the presence of an organic non-nucleophilic base in order to scavenge the halide-containing byproduct of the reaction. Representative suitable non-nucleophilic bases include alkylamines such as triethylamine, trimethylamine, or the like, pyridines, alkyl pyridines, alkyl piperidines, N-alkyl pyrrolidines, or the like. The reaction can be carried out in the absence of a solvent under conditions where there is enough mobility of the reactants to interact with each other such as when the non-nucleophilic base functions as a medium for the reaction. Other suitable halide-containing byproduct scavengers include KF, $Na_2CO_3$, Zn powder, CsF, or the like. Reaction is effected under anhydrous conditions such as under an inert atmosphere such as argon, nitrogen or the like in a vessel or a glove box at a temperature between about 0 and about 200° C., preferably between about 25 and about 125° C. Suitable reaction times are between about 5 minutes and about 72 hours, preferably between about 1 hour and about 24 hours. The reaction can be effected while mixing.

When the fluorocarbon polymer precursor is in solution, it is contacted with the substituted or unsubstituted amide or sulfonamide-containing reactant or salt thereof under the conditions set forth above. The product is recovered as a solid such as by precipitation or by removing the solvent. Representative suitable solvents for the fluorocarbon polymer precursor include halogenated solvents such as polychlorotrifluoroethylene, for example Halocarbon™ oil, perfluoroalkylamines, for example Fluorinert™ FC-70, or the like.

In another aspect of this invention, the branched fluorocarbon polymeric composition having hydrophilic functional groups of this invention is prepared by reacting a fluorocarbon polymer precursor containing at least one pendant substituted or unsubstituted amide or sulfonamide groups having the formula:

 (6)

wherein t, R, T, R' and $R_f$ are defined above. Representative suitable R and R' include hydrogen, $CH_3$, $C_2H_5$, $C_2FH_4$, or the like, Alternatively, an organic or inorganic salt of the amide or sulfonamide group can be used, having the formula:

 (7)

wherein T, t, R, $R_f$ and $Z^+$ are defined above, with a sulfonyl or carbonyl halide-containing reactant or mixtures thereof of the formula:

$R_f'$-T-X (8)

wherein T, $R_f'$ and X are defined above. The fluorocarbon polymer precursor containing pendant amide or sulfonamide groups can be prepared by reacting the sulfonyl or carbonyl halide groups of a fluorocarbon polymer precursor having sulfonyl or carbonyl halide groups with anhydrous ammonia. The anhydrous ammonia can be in the gas or liquid phase. This amidation reaction can be conducted at a temperature between about −78° C. and about 100° C. Suitable amidation reaction times are between about 1 second and about 1 hour, preferably between about 5 seconds and about 15 minutes. The fluorocarbon polymeric composition having amide or sulfonamide groups is recovered in the ammonium salt form and can be further converted to the free amide or sulfonamide form by contact with acid. The reaction of the resulting amide or sulfonamide or salt thereof with the sulfonyl or carbonyl halide-containing reactant is carried out under the conditions set forth above and proceeds in an analogous manner as described in scheme 1.

In an alternative embodiment of this invention, the chain length of the $R_f'$ sulfonyl or carbonyl-containing fluoropolymeric group of formula (1c) can be controlled by one of two methods. In the first method, the fluorocarbon polymer precursor containing at least one pendant sulfonyl or carbonyl halide group of formula (3) is reacted with a difunctional fluoroalkylene amide or sulfonamide reagent of formulae (10) or (11) when n is 0 to result in a terminal amide or sulfonamide group. The terminal amide or sulfonamide group then is reacted with a difunctional fluoroalkylene sulfonyl or carbonyl halide reagent of formula (12) when n is 0 to result in a terminal sulfonyl or rarbonyl halide group. These reaction steps are repeated until the desired chain length of the $R_f'$ is attained. When the product contains a terminal sulfonyl or carbonyl halide group, this sulfonyl or carbonyl halide group can be hydrolyzed in a conventional manner. In the second method, the fluorocarbon polymer precursor containing at least one pendant amide or sulfonamide group of formulae (6) or (7) is reacted with a difunctional fluoroalkylene sulfonyl or carbonyl halide reagent of formula (12) when n is 0 to result in a terminal sulfonyl or carbonyl halide group. The terminal sulfonyl or carbonyl halide group then is reacted with a difunctional fluoroalkylene amide or sulfonamide reagent of formulae (10) or (11) when n is 0 to result in a terminal amide or sulfonamide group. These reaction steps are repeated until the desired chain length of the $R_f'$ group is attained. When the product contains a terminal sulfonyl or carbonyl halide group, this sulfonyl or carbonyl halide group can be hydrolyzed in a conventional manner.

The branched fluorocarbon polymeric composition having hydrophilic functional groups of this invention can be formed wherein the starting sulfonyl or carbonyl halide groups or the amide or sulfonamide groups of the fluorocarbon polymer precursor can be partially or completely converted to imide or sulfonimide groups in accordance with this invention. If desired, the remaining sulfonyl or carbonyl halide groups or amide or sulfonamide groups of the partially converted polymer can be converted to other functional groups such as sulfonic acid groups or salts thereof.

In another aspect of this invention, a crosslinked fluorocarbon, such as perfluorocarbon, polymeric composition having hydrophilic functional groups of this invention is provided having connecting bridges or crosslinks having sulfonyl or carbonyl-containing groups joining polymeric chains, which can include loops joining portions of a polymeric chain, such as compositions having the formula:

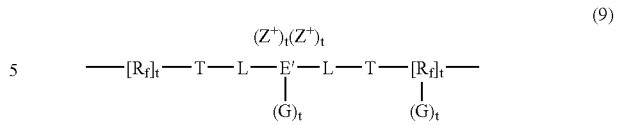

covalently bonded through the $R_f$ groups each to a CY group of a fluorocarbon polymeric composition of the formula:

wherein A is a polymeric group derived from at least one fluorine-containing polymerizable monomer, n is an integer that can be 0, 1 or greater than 1; m is an integer of at least 1 and Y is hydrogen or halogen wherein at least one Y is a fluorine; T is a carbonyl or sulfonyl group; $R_f$ is a $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, $Z^+$ is a proton or an organic or an inorganic cation; t can be 0 or 1; L is C, CH or N; E' is -T$R_f''$T- or —$R_f'$—; G is $R_f'$T- or R; $R_f'$ and $R_f''$ can be the same or different and can be a $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonylcontaining fluoropolymeric group, optionally connected to another chain of the fluorocarbon polymeric composition having hydrophilic functional groups and R is hydrogen or a substituted or unsubstituted alkyl or aryl group.

Representative crosslinked fluorocarbon polymeric compositions having hydrophilic functional groups of formula (9) include:

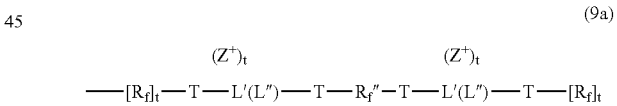

wherein L' is C⁻ or CH, L" is H or -T$R_f''$ and T, $Z^+$, $R_f$, $R_f''$ and t are defined above, or

or

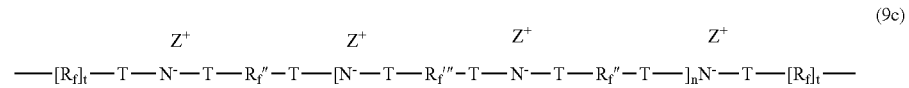

wherein T, $R_f$, $R_f''$, R, n, t, and $Z^+$ are defined above and $R_f'''$ is a $C_1$-$C_{20}$ linear, cyclic or branched fluoroalkyl, preferably perfluoroalkyl, group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon polymeric composition having hydrophilic functional groups.

The compound of formula (9a) is formed by reacting a fluorocarbon polymer precursor containing at least one pendant sulfonyl or carbonyl halide group with a compound containing the functional group $C^{-2}(SO_2R_f'')SO_2R_f''SO_2C^{-}_2(SO_2R_f'')$ $(2Z^{+2})$ or $C^{-2}(COR_f'')COR_f''C(O)C^{-2}(COR_f'')$ $(2Z^{+2})$ or by reacting a compound of the formula $—[R_f]_t SO_2C^{-2}SO_2R_f''SO_2C^{-2}SO_2[R_f]_t—$ $(2Z^{+2})$ or $—[R_f]_tC(O) C^{-2} COR_f''C(O)C^{-2}CO[R_f]_t—$ $(2Z^{+2})$ with a compound of the formula $R_f''SO_2X$ or $RF''COX$. The compounds of formulae $C^{-2}(SO_2R_f'')SO_2R_f''SO_2C^{-2}(SO_2R_f'')$ $(2Z^{+2})$ or $C^{-2}(COR_f'')COR_f''C(O)C^{-2}(COR_f'')$ $(2Z^{+2})$ and $—[R_f]_t SO_2C^{-2}SO_2R_f''SO_2C^{-2}SO_2[R_f]_t—$ $(2Z^{+2})$ or $—[R_f]_tC(O) C^{-2}COR_f''C(O)C^{-2}CO[R_f]_t—$ $(2Z^{+2})$ can be prepared by reacting the corresponding sulfonyl methanes with an alkylmagnesium halide by the method described in U.S. Pat. No. 2,732,398, which is incorporated herein by reference. Suitable compounds of the formula $C^{-2}(SO_2R_f'')SO_2R_f''SO_2C^{-2}(SO_2R_f'')$ $(2Z^{+2})$ include $CF_3SO_2C^{-2}SO_2(CF_2)_6SO_2C^{-2}SO_2CF_3$ 4MgCl$^-$, $CF_3SO_2C^{-2}SO_2CF_2SO_2C^{-2}SO_2CF_3$ 4MgCl$^-$, or the like. Suitable compounds of the formula $C^{-2}(COR_f'')COR_f''C(O)C^{-2}(COR_f'')$ $(2Z^{+2})$ include $CF_3C(O)C^{-2}CO(CF_2)_6C(O)C^{-2}C(O)CF_3$ 4MgCl$^-$, $CF_3C(O)C^{-2}C(O)CF_2C(O)C^{-2}C(O)CF_3$ 4MgCl$^-$, or the like.

The compound of formula (9b) is formed by reacting a fluorocarbon polymer precursor containing at least one pendant sulfonyl or carbonyl halide group with a compound of the formula $N(R)HR_f''NH(R)$ such as $NH_2(CF_2)_6NH_2$, $NH_2CF_2NH_2$, or the like.

In another aspect of this invention, the crosslinked fluorocarbon polymeric composition having hydrophilic functional groups of this invention is provided having connecting bridges or crosslinks with at least two sulfonimide groups joining polymeric chains, which can include loops joining portions of a polymeric chain, such as compositions having the formula (9d):

(9d)

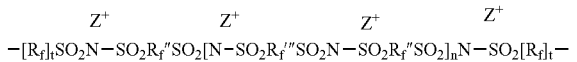

covalently bonded through the $R_f$ groups, each to a CY group of a fluorocarbon polymeric composition of the formula:

(2)

wherein A, Y, m, $R_f$, $R_f''$, $R_f'''$, n, t, and $Z^+$ are defined above. Representative suitable $R_f''$ and $R_f'''$ include —(CF$_2$)—, —(C$_2$F$_3$H)—, —[CF$_2$CF(CF$_3$)OCF$_2$CF$_2$]—, —(C$_2$F$_4$)—, —(C$_4$F$_8$)—, —[CF$_2$OCF$_2$CF(OCF$_2$SO$_2$F)CF$_2$]—, —(C$_8$F$_{16}$)—, or the like. Representative imide or sulfonimide-containing fluoropolymeric groups or organic or inorganic salts of the imide or sulfonimide groups can be formed from the compounds of formulae (10), (11) and (12).

In one aspect of this invention, the crosslinked fluorocarbon polymeric composition having hydrophilic functional groups of this invention is prepared by reacting a fluorocarbon polymer precursor containing at least one pendant sulfonyl or carbonyl halide group having the formula;

—[R$_f$]$_t$-T-X (3)

wherein T, t, X and $R_f'$ are defined above, with a reactant containing at least two substituted or unsubstituted amide or sulfonamide groups or mixtures thereof such as reactants having the formula:

(10)

or:

(11)

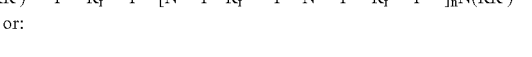

or mixtures thereof, wherein T, R, R', $R_f''$, $R_f'''$, n and $Z^+$ are defined above. Reagents (10) and (11) wherein n is 0 can be formed by first forming the difunctional fluoroalkylene sulfonyl or carbonyl halide precursor to reagents (10) and (11), when n is 0, by the process disclosed by Burton et al in Journal of Fluorine Chemistry Vol. 60 (1993), pp. 93-100, which is incorporated herein by reference. The difunctional fluoroalkylene sulfonyl or carbonyl halide can be converted to the difunctional fluoroalkylene amide or sulfonamide of reagents (10) and (11), when n is 0, by reaction thereof with anhydrous ammonia under the conditions set forth herein. When n is 1 or greater reagents (10) and (11) can be formed by reacting a difunctional fluoroalkylene sulfonyl or carbonyl halide with a difunctional fluoroalkylene amide or sulfonamide by the process of U.S. Pat. No. 5,874,616, which is incorporated herein by reference but with the difunctional fluoroalkylene amide or sulfonamide in excess so that the end groups comprise amide or sulfonamide groups.

Alternatively a fluorocarbon polymer precursor containing at least one pendant sulfonyl or carbonyl halide group of reactant (3) can be reacted with a fluorocarbon polymer precursor containing at least one pendant amide or sulfonamide group of reactant (6) or (7) defined above. The crosslinks of the crosslinked fluorocarbon polymeric composition having hydrophilic functional groups of this embodiment contain at least one imide or sulfonimide group.

The reaction of the fluorocarbon polymer precursor with the reactant containing at least two substituted or unsubstituted amide or sulfonamide groups or salts thereof is believed to proceed via a condensation mechanism between the sulfonyl or carbonyl halide groups of the fluorocarbon polymer precursor and the amide or sulfonamide groups of the reactant containing at least two amide or sulfonamide groups thereby liberating a halide-containing byproduct. A non-nucleophilic base is typically used to scavenge and bind the halide-containing byproduct so that the reaction can proceed to the formation of the crosslinked fluorocarbon polymeric composition having hydrophilic functional groups. The reaction is believed to proceed according to the following scheme 2, with reference to the reactant containing at least two substituted or unsubstituted amide or sulfonamide groups of formula (10):

Scheme 2

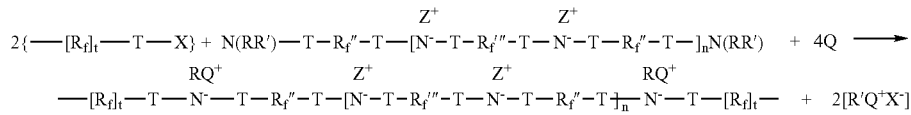

wherein Q is a non-nucleophilic base, $RQ^+$ and $R'Q^+$ are cations derived from the non-nucleophilic base and T, $R_f$, $R_f'$, $R_f'''$, X, R, R', $Z^+$, n and t are defined above.

Reaction of the fluorocarbon polymer precursor having sulfonyl or carbonyl halide groups with the reactant containing at least two substituted or unsubstituted amide or sulfonamide groups or salts thereof can be carried out with the fluorocarbon polymer precursor being in solid form, solvent-swollen form or in solution with the appropriate reactants in the solid, liquid or gas phase. When the fluorocarbon polymer precursor is in the solid form, the reaction is carried out under anhydrous conditions by contacting it with the reactant containing at least two substituted or unsubstituted amide or sulfonamide groups or salts thereof in a solvent that is non-reactive with the starting reactants. Representative suitable solvents include anhydrous polar aproutic solvents such as acetonitrile, tetrahydrofuran, dioxane, or the like, halogenated solvents such as chloroform, or the like. The reaction is carried out in the presence of an organic non-nucleophilic base in order to scavenge the halide-containing byproduct of the reaction, including alkylamines such as triethylamine, trimethylamine, or the like, pyridines, alkyl pyridines, alkyl piperidines, N-alkyl pyrrolidines, or the like. The reaction can be carried out in the absence of a solvent under conditions where there is enough mobility of the reactants to interact with each other such as when the non-nucleophilic base functions as a medium for the reaction. Other suitable halide-containing byproduct scavengers include KF, $Na_2CO_3$, Zn powder, CsF, or the like. Reaction is effected under anhydrous conditions such as under an inert atmosphere such as argon, nitrogen or the like in a vessel or a glove box at a temperature between about 0 and about 200° C., preferably between about 25 and about 125° C. Suitable reaction times are between about 5 minutes and about 72 hours, preferably between about 1 hour and about 24 hours. The reaction can be effected while mixing.

When the fluorocarbon polymer precursor is in solution, it is contacted with the reactant containing at least two substituted or unsubstituted amide or sulfonamide groups or salts thereof under the conditions set forth above. The crosslinked product is recovered. Representative suitable solvents for the fluorocarbon polymer precursor include halogenated solvents such as polychlorotrifluoroethylene such as Halocarbon™ oil, perfluoroalkylamines such as Fluorinert™ FC-70, or the like.

When the reaction between the fluorocarbon polymer precursor containing at least one pendant sulfonyl or carbonyl halide group of reactant (3) and the fluorocarbon polymer precursor containing at least one pendant amide or sulfonamide group of reactant (6) or (7) is effected, the reaction can be effected under the same conditions set forth above with reference to the reactant containing at least two substituted or unsubstituted amide or sulfonamide groups or salts thereof.

In another aspect of this invention, the crosslinked fluorocarbon polymeric composition having hydrophilic functional groups of this invention is prepared by reacting a fluorocarbon polymer precursor containing at least one pendant substituted or unsubstituted amide or sulfonamide group having the formula:

(6)

wherein T, R, t, R' and $R_f$ are defined above. Alternatively, an organic or inorganic salt of the amide or sulfonamide group can be used, having the formula:

(7)

wherein the groups of formulae (6) and (7) comprise a branch or side group covalently bonded through the $R_f$ group to a CY group of a fluorocarbon polymeric composition of the formula:

(2)

wherein A, Y, n, m, T, R, $R_f$, t and $Z^+$ are defined above, with a reactant containing at least two sulfonyl or carbonyl halide groups or mixtures thereof such as compositions having the formula:

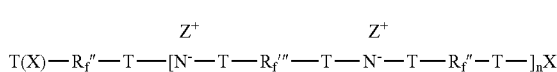

wherein T, $R_f''$, $R_f'''$, n, X and $Z^+$ are defined above. The fluoroalkylene sulfonyl or carbonyl halide reagent of formula (12), wherein n is 0 can be formed by the process disclosed by Burton et al in Journal of Fluorine Chemistry Vol. 60 (1993), pp. 93-100, which is incorporated herein by reference. When n is 1 or greater, reagent (12) can be formed by reacting a difunctional fluoroalkylene sulfonyl or carbonyl halide with a difunctional fluoroalkylene amide or sulfonamide by the.process of U.S. Pat. No. 5,874,616, which is incorporated herein by reference but with the difunctional fluoroalkylene sulfonyl or carbonyl halide in excess so that the end groups comprise sulfonyl or carbonyl halide groups.

The fluorocarbon polymer precursor containing pendant amide or sulfonamide groups can be prepared by reacting the sulfonyl or carbonyl halide groups of a fluorocarbon polymer precursor having sulfonyl or carbonyl halide groups with anhydrous ammonia. The anhydrous ammonia can be in the gas or liquid phase. This amidation reaction can be conducted at a temperature between about −78° C. and about 100° C. Suitable amidation reaction times are between about 1 second and about 1 hour, preferably between about 5 seconds and about 15 minutes. The fluorocarbon polymer precursor containing pendant amide or sulfonamide groups is recovered in the ammonium salt form and can be further converted to the free amide or sulfonamide form by contact with acid. The reaction of the resulting fluorocarbon polymer precursor containing at least one pendant substituted or unsubstituted amide or sulfonamide group or salts thereof with the reactant containing at least two sulfonyl or carbonyl halide groups represented in formula (12) is carried out under the conditions set forth above and proceeds in an analogous manner as described in scheme 2.

In an alternative embodiment of this invention, the chain length represented by n of formula (9c) can be controlled by first forming a starting polymer containing terminal sulfonyl or carbonyl halide groups and a polymer containing terminal amide or sulfonamide groups, which are then reacted with each other to form the crosslinks having the desired n. The starting polymer containing terminal sulfonyl or carbonyl halide groups can be the fluorocarbon polymer precursor containing at least one pendant sulfonyl or carbonyl halide group of formula (13) or can be formed by reacting a fluorocarbon polymer precursor containing at least one pendant sulfonyl or carbonyl halide group of formula (13) with a difunctional fluoroalkylene amide or sulfonamide reagent of formulae (10) or (11) when n is 0 to result in a terminal amide or sulfonamide group. The terminal amide or sulfonamide group then is reacted with a difunctional fluoroalkylene sulfonyl or carbonyl halide reagent of formula (12) when n is 0 to result in a terminal sulfonyl or carbonyl halide group. These reaction steps are repeated until a desired first portion of the chain length, defined by n, is attained and the final reaction is with the difunctional fluoroalkylene sulfonyl or carbonyl halide reagent of formula (12) when n is 0 to result in a terminal sulfonyl or carbonyl halide group. The polymer containing terminal amide or sulfonamide groups can be the fluorocarbon polymer precursor containing at least one pendant amide or sulfonamide group of formulae (6) or (7) or can be formed in the same manner set forth above for the starting polymer containing terminal sulfonyl or carbonyl halide groups until a desired second portion of the chain length, defined by n, is attained and the final reaction is with the difunctional fluoroalkylene amide or sulfonamide reagent of formulae (10) or (11) when n is 0 to result in a terminal amide or sulfonamide group. The starting polymer containing terminal sulfonyl or carbonyl halide groups also can be formed by reacting a fluorocarbon polymer precursor containing at least one pendant amide or sulfonamide group of formulae (6) or (7) with a difunctional fluoroalkylene sulfonyl or carbonyl halide reagent of formula (12) when n is 0 to result in a terminal sulfonyl or carbonyl halide group.

By increasing the chain length of the cross linking moiety such as described in formula 9(C), wherein n is 1 or greater than 1, preferably greater than 1, higher numbers of hydrophilic functional groups of the final cross-linked fluorocarbon polymeric composition can be obtained. When n is 1 or greater than 1, it is a polymeric cross-linking moiety. Alternatively in Formula 9, the $R_f''$ of the E' is either a sulfonyl or carbonyl containing fluoropolymeric group, optionally, connected to another chain of the fluorocarbon polymeric composition having hydrophilic functional groups. Thus the number of hydrophilic functional groups in the cross linking moiety as well as the final cross-linked fluorocarbon polymeric composition can be controlled.

The cross-linked fluorocarbon polymeric composition having hydrophilic functional groups of this invention can be formed wherein the starting sulfonyl or carbonyl halide groups or the amide or sulfonamide groups of the fluorinated polymer precursor can be partially or completely converted to the crosslinking bridges in accordance with this invention. If desired, the remaining sulfonyl or carbonyl halide groups or amide or sulfonamide groups of the partially converted polymer can be converted to other functional groups such as imide or sulfonimide groups or sulfonic acid groups or salts thereof.

EXAMPLE 1

This example details the process for converting a commercially available non-porous perfluoroionomer film made from a fluorocarbon polymer precursor having sulfonyl fluoride groups to the sulfonamide form.

A piece of commercially available Nafion® NE-105F film made from a perfluoroionomer in the sulfonyl fluoride form having an equivalent weight of 980 was placed in a small stainless pressure vessel. The vessel was evacuated to a pressure no greater than 100 m Torr for at least 5 minutes. Gaseous anhydrous ammonia was then introduced into the vessel until the pressure in the vessel reached 60 psi. The film remained in contact with anhydrous ammonia for 30 hours at 60° C. The vessel was allowed to equilibrate to room temperature, vented and purged with argon for five minutes. The film was removed from the vessel, rinsed in water and exposed to nitric acid to convert the membrane into the free sulfonamide form. The membrane was further rinsed with water and dried at room temperature.

The film appears stronger and stiffer than the starting film. Attenuated total reflectance FTIR of the film reveals the presence of sulfonamide groups. No significant amounts of sulfonyl fluoride groups remain on the film indicating complete conversion to the sulfonamide form.

EXAMPLE 2

This example details the process for converting the film in the sulfonamide form from example 1 to the perfluorobutane sulfonimide form.

Working under strictly anaerobic and anhydrous conditions in a glove box under argon, the dry film in the sulfonamide form from example 1 was immersed in a solution containing 0.5 ml perfluorobutanesulfonyl fluoride and 5 ml anhydrous triethylamine in a small pressure vessel. The vessel was closed and charged with argon to 60 psi. The vessel was closed and placed in an oven at 100° for 63 hours. The vessel was removed from the oven and allowed to equilibrate to room temperature. The pressure was released from the vessel and the vessel was opened under ambient conditions. The film was removed from the vessel and rinsed with three tetrahydrofuran rinses, followed by three water rinses and finally contacted with nitric acid to convert the film into the free acid form. The film was further rinsed with water and dried at room temperature.

The film appears to have softer mechanical properties than the film in the sulfonamide form. The film was equilibrated in boiling ethanol and the degree of swelling was measured to be 64%. Attenuated total reflectance FTIR of the film reveals the presence of sulfonimide groups. No significant amounts of sulfonamide groups remain on the membrane indicating complete conversion to the sulfonimide form.

EXAMPLE 3

This example details the process for crosslinking the film in the sulfonamide form from example 1 using sulfonimide linkages.

Working under strictly anaerobic and anhydrous conditions in a glove box under argon, the dry film in the sulfonamide form from example 1 was immersed in a solution containing 0.5 ml of perfluorobutane-1,4-bis-sulfonyl fluoride and 5 ml anhydrous triethylamine in a small pressure vessel. The vessel was closed and charged with argon to 60 psi. The vessel was closed and placed in an oven at 100° for 63 hours. The vessel was removed from the oven and allowed to equilibrate to room temperature. The pressure was released from the vessel and the vessel was opened under ambient conditions. The film was removed from the vessel and rinsed with three tetrahydrofuran rinses, followed by three water rinses and finally contacted with nitric acid to convert the film into the free acid form. The film was further rinsed with water and dried at room temperature.

The film appears stronger and stiffer than the film in the sulfonamide form. The film was equilibrated in boiling ethanol and the degree of swelling was measured to be 30%. Attenuated total reflectance FTIR of the film reveals the presence of sulfonimide groups. No significant amounts of sulfonamide groups remain on the membrane indicating crosslinking of the film using sulfonimide linkages.

What is claimed is:

1. A crosslinked fluorocarbon polymeric composition having hydrophilic functional groups of the formula:

$$-[R_f]_t-T-N^--T-R_f''-T-[N^--T-R_f'''-T-N^--T-R_f''-T-]_nN^--T-[R_f]_t-$$

with $Z^+$ above each $N^-$ covalently bonded through the $R_f$ groups, each to a CY group of a fluorocarbon polymeric composition of the formula:

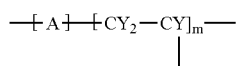

wherein A is a polymeric group derived from at least one fluorine-containing polymerizable monomer, n is an integer that can be 1 or greater than 1; m is an integer of at least 1 and Y is hydrogen or halogen wherein at least one Y is a fluorine; T is a carbonyl or sulfonyl group; $R_f$ is a $C_1$-$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, wherein the $R_f$ groups can be the same or different; $R_f''$ and $R_f'''$ can be the same or different and can be a $C_1$-$C_{20}$ linear, cyclic or branched fluoroalkyl group optionally containing one or more oxygen, nitrogen, chlorine, phosphorous, hydrogen and/or sulfur atoms and/or one or more sulfonyl or carbonyl groups, or a sulfonyl or carbonyl-containing fluoropolymeric group, optionally connected to another chain of the fluorocarbon polymeric composition having hydrophilic functional groups; $Z^+$ is a proton or an organic or an inorganic cation and t can be 0 or 1.

2. The crosslinked fluorocarbon polymeric composition having hydrophilic functional groups of claim 1 wherein A is selected from the group consisting of vinyl fluoride, hexafluoropropylene, vinylidene fluoride, trifluoroethylene, chlorotrifluoroethylene, perfluoro(alkylvinyl ether) and tetrafluoroethylene.

3. A crosslinked fluorocarbon polymeric composition having hydrophilic functional groups of the formula:

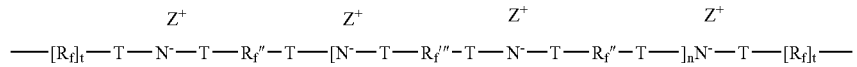

covalently bonded through the $R_f$ groups each to a CY group of a fluorocarbon polymeric composition of the formula:

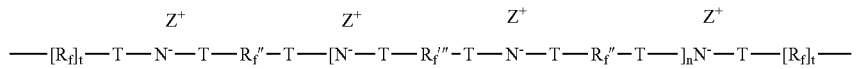

wherein A is a polymeric group derived from at least one fluorine-containing polymerizable monomer, n is an integer that can be 1 or greater than 1; m is an integer of at least 1 and Y is hydrogen or halogen wherein at least one Y is a fluorine; T is a carbonyl or sulfonyl group, optionally connected to another chain of the fluorocarbon polymeric composition having hydrophilic functional groups.

4. The crosslinked fluorocarbon polymeric composition having hydrophilic functional groups of claim 3 wherein A is selected from the group consisting of vinyl fluoride, hexafluoropropylene, vinylidene fluoride, trifluoroethylene, chlorotrifluoroethylene, perfluoro(alkylvinyl ether) and tetrafluoroethylene.

* * * * *